Feb. 24, 1925.

J. NASS ET AL 1,527,373

ANIMAL TRAP

Filed June 14, 1923

INVENTOR
Julius Nass
George Mohr
BY
Fred C. Matheny
ATTORNEY

Patented Feb. 24, 1925.

1,527,373

UNITED STATES PATENT OFFICE.

JULIUS NASS AND GEORGE MOHR, OF SEATTLE, WASHINGTON.

ANIMAL TRAP.

Application filed June 14, 1923. Serial No. 645,446.

*To all whom it may concern:*

Be it known that we, JULIUS NASS and GEORGE MOHR, citizens of the United States, residing at Seattle, in the county of King and State of Washington, have invented a certain new and useful Improvement in Animal Traps, of which the following is a specification.

This invention relates to improvements in animal traps, and the object of the improvement is to provide a combined rat and mouse trap that is entirely automatic in operation and that has a very large capacity, each animal that is caught being caused to move forward or proceed from the first compartment of the trap into another compartment from which it can not escape and being caused to re-set the trap as it enters said last named compartment.

Another object is to provide a trap of this nature that is neat, substantial and compact in construction, efficient in operation, not expensive to manufacture and easy and convenient to handle and take care of.

A further object is to provide a trap of this nature in which certain of the sides toward which the animal looks in entering various compartments of the trap are made of clear glass so that the animal is able to see what appears to be an unobstructed passageway through the trap.

A still further object is to provide sharp pointed means that will be caused to come in contact with an animal as it passes the same to thereby prevent the return of animal after it has proceeded a distance into the trap.

A still further object is to provide devices which will cause the animal to move the above mentioned pointed means into a set position as it approaches the same.

Other and more specific objects will be apparent from the following description taken in connection with the accompanying drawings.

In the drawings, Figure 1 is a perspective view of a combined rat and mouse trap constructed in accordance with this invention.

Fig. 6 is an enlarged fragmentary sectional view substantially on broken line 6—6 of Fig. 3.

Fig. 7 is a fragmentary sectional view similar to Fig. 2 showing certain parts in a different operative position.

Like reference numerals designate like parts, throughout the several views.

Figure 1:
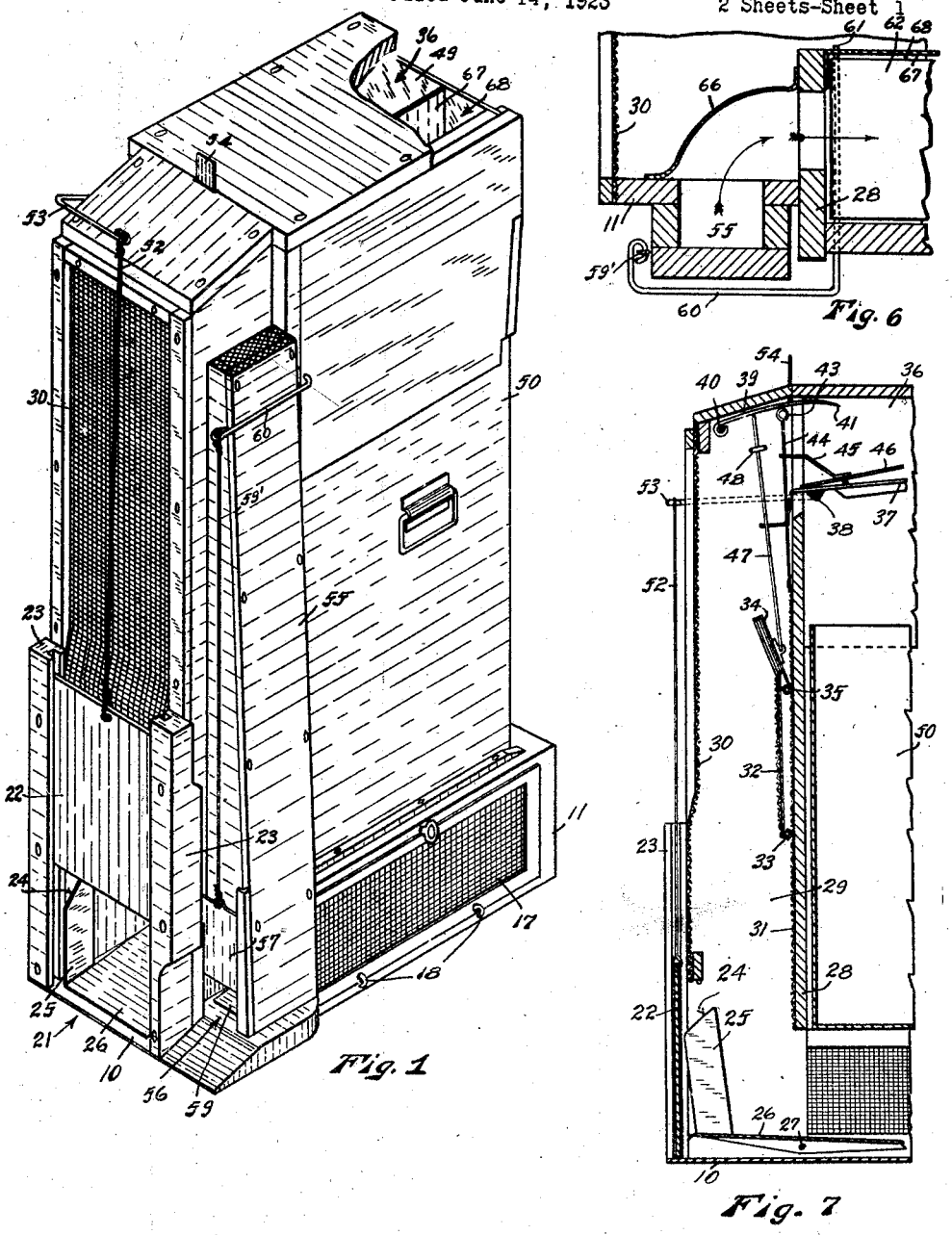

In the drawings, we have shown a combined rat and mouse trap embodying a base plate 10 preferably of sheet metal, whereon is mounted an upright frame 11, which may be made of wood, and which forms, in a general way, a trap housing.

A lower trap chamber into which animals may enter is formed in the bottom of the housing 11, said chamber being divided by a longitudinal partition 12, preferably of wire mesh, into a larger compartment 13 for rats, and a smaller compartment 14 for mice. A bait chamber 15 having wire mesh walls 16 is provided at the rear end of the mouse compartment 14. A swinging door 17 hinged on staples 18 and preferably formed of wire mesh on a frame is provided on the outer side of the mouse compartment 14 and, when lowered affords access to the bait compartment 15.

The outer side of the rat compartment 13 is preferably formed of wire mesh as shown at 19 and the rear end wall of said rat compartment is formed of a transparent plate 20, which affords an unobstructed view and gives the trap the appearance of having an unobstructed passageway through the rat compartment.

An opening 21, arranged to be closed by a door 22 that slides vertically in grooved guide members 23, is provided at the front of the rat compartment and affords means through which rats may enter. The door 22 is arranged to rest upon an inclined surface 24 of a trip member 25 that is rigid with a platform 26 which is pivoted as at 27, Fig. 2, so that the trip member 25 will support the door 22 in the raised position and will release said door and permit the same to drop down when an animal, as a rat, moves onto the rear end of the platform 26.

The trap housing is provided with an upright frame member 28 that serves as a rear wall for a substantially vertical passageway 29 that communicates with the rat compartment 13 near the forward end thereof, the front wall of the passageway 29 being formed of wire mesh as indicated at 30.

Other wire mesh indicated at 31 is preferably provided on the wall 28 to render the same more easily climbed by the animal.

An obstruction device, which the rat must crowd past and which will drop down and prevent the return of the rat, is provided in the upright passageway 29, said obstruction device comprising a normally inclined plate 32, pivoted as at 33 and arranged to support the outer end of a normally horizontal plate 34 that is pivoted as at 35. The tendency of a rat as it ascends the passageway 29 will be to crowd the yielding obstruction member upwardly, see Fig. 7, and then allow the same to drop and prevent the return of the rat.

Figure 2:
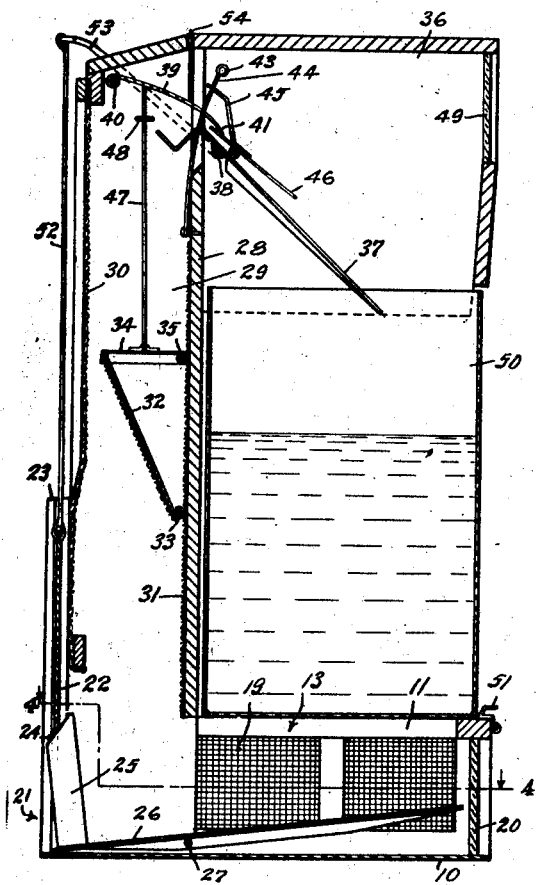
Fig. 2 is a vertical cross section through the compartments used for catching rats.
Figure 3:
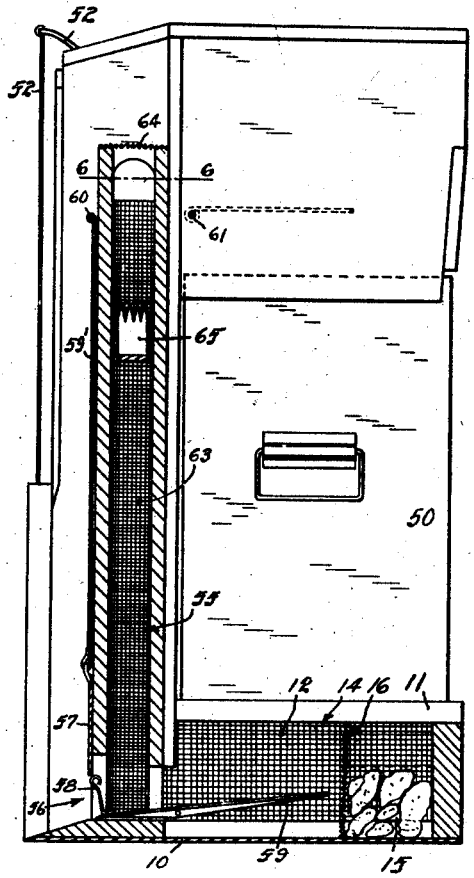
Fig. 3 is a vertical cross section through the compartments used for catching mice.
Figure 4:
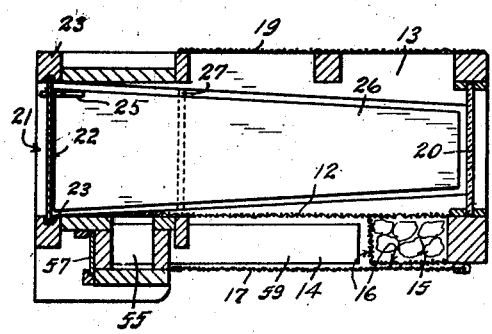
Fig. 4 is a cross sectional view substantially on broken line 4—4 of Fig. 2.

When the rat reaches the top of the passageway 29 the only opening through which he can proceed will be a transverse compartment 36, the bottom of which is formed by a trap door 37 that is secured to a transverse pivot rod 38 and is free to swing downwardly as shown in Fig. 2.

To prevent the return of the rat after entering the compartment 36, we provide a member 39 pivoted at 40 and having on its forward end prongs 41 arranged to drop down onto the neck or back of the animal.

Figure 5:
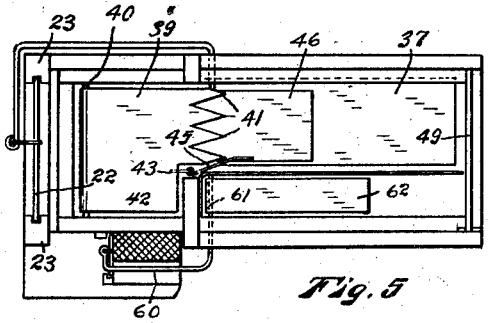
Fig. 5 is a plan view of the trap with the cover plates removed.

The pronged member 39 has an extension 42, Fig. 5, projecting sidewise therefrom, that is arranged to rest on the rounded upper end 43 of a flexible wire support 44 by which said pronged member is supported in a raised position. Trip means in the form of another wire 45 secured to a pedal 46 that is pivoted on the trap door platform 37 are provided for the pronged member 39. A wire rod 47 pivoted to the obstruction member 34 and guided in bracket 48 is arranged to engage beneath the pronged member 39 and lift the same into a set position, when the obstruction member is raised by the ascent of a rat through the passageway 29. A transparent plate 49 is provided in the rear end of the transverse passageway 36 to give to said passageway the appearance of being open and unobstructed.

The passageway 36 is formed in an overhanging portion of the trap frame and a receptacle 50 preferably liquid tight and adapted to be partly filled with water is removably disposed below said overhanging frame portion and rests upon and forms a top wall for the rear portion of the bottom compartment 13, said receptacle being arranged to receive rats that are dropped thereinto off of the trap door platform 37. The receptacle 50 is releasably held, at the bottom, by a catch member 51 and the top end of said receptacle, is supported between the sides of the overhanging frame portion.

The vertically movable door 22 at the front of the rat compartment is connected by a cable 52 with a crank arm 53 on the end of the rod 38 to which the trap door platform 37 is secured so that when the rat enters and drops the door 22 the trap door platform 37 will be raised and when the rat after ascending the passageway 29 moves out onto the trap door platform and swings the same downwardly as said rat drops into the receptacle 50 the door 22 will be raised and the trap set for catching another rat.

Wooden parts on the interior of the trap that are liable to be gnawed by mice and rats may be covered with sheet metal.

All trip parts are nicely balanced so that they will operate easily in response to the presence of an animal on the pedals or trap doors.

An indicator or signal device 54 is allowed to rest on the top of the pronged member 39 and project upwardly through the top of the housing to indicate whether or not there are any rats in the trap.

In operation a rat, lured by bait in chamber 15, enters through opening 21, walks on platform 26, releases trip 24, letting drop door 22, thus preventing his escape. Shut in the lower compartment 13 and unable to get the bait in compartment 15 the rat climbs through the passageway 29, operating obstruction devices 32 and 34 and thereby lifting pronged member 39. After passing the obstruction devices the rat can not return but proceeds onto pedal 46 thereby tripping pronged member 39 which falls on the rat and makes it impossible for said rat to go in any direction except toward the end of the trap door platform 37 which swings downwardly under the weight of the rat dropping the rat into the receptacle 50 and at the same time lifting the vertically movable door 22 so that the trip member 24 may move thereunder and hold the door 22 open until the next rat enters.

The rats being plunged into the water in the receptacle 50 quickly drown without creating any appreciable disturbance to frighten other rats. The drowning of the rats disposes of them in as humane and as sanitary a manner as possible.

The mouse trap devices comprise an upright passageway 55 arranged at one side of the trap and communicating with the forward end of the smaller lower horizontal compartment 14. An opening 56 at the front of the compartment 14 is arranged to be closed by a vertically movable door 57 releasably supported by trip member 58 that is secured to pivotally mounted pedal member 59, which is disposed in compartment 14. Vertically movable door 22 is connected by cable 59′ with crank arm 60 on the end of wire rod 61 to which trap door platform 62 is secured so that when trap door platform 62 is depressed door 22 will be opened. The passageway 55 is preferably separated from the passageway 29 of the rat compartment by wire mesh wall 63 only and is covered with wire mesh 64 at the top to afford light toward which a mouse may climb. A flexible pronged obstruction device 65 is provided in the passageway 55 which the mouse can easily crowd past but which will prevent said mouse from returning. A corner conduit 66 Fig. 6 permits the mouse to pass from the passageway 55 onto the trap door platform 62 which discharges into receptacle 50. A partition wall 67 divides the compartment 68 in which the trap door platform 62 is located from the corresponding rat compartment 36.

The operation of the trap in catching mice is substantially the same as the operation in catching rats, the trap being set for another mouse each time a previously caught mouse is dropped into the receptacle 50.

The trap is extremely compact and convenient in construction and combines both a rat and mouse trap into one unitary structure.

The foregoing description and accompanying drawings clearly disclose a preferred embodiment of our invention, but, it will be understood that this disclosure is merely illustrative and that such changes in the device may be made as are within the scope and spirit of the following claims.

We claim:

1. In a trap of the class described, a trap housing having a lower compartment provided with an opening through which animals may enter, a vertically movable door arranged to drop by gravity to close said opening, a transverse passageway at the upper end of said upright passageway, a pronged member in said transverse passageway, a pivotally mounted trip plate, means on said trip plate for supporting said pronged member, in a raised position, and releasing the same when an animal moves onto said trip plate, a pivotally mounted trap door member forming the bottom of said transverse passageway, said trip plate being pivoted on said trap door member, movable obstruction devices in said upright passageway, arranged to be lifted by the passage of an animal thereby, means connected with said obstruction devices for raising and setting said pronged member when said obstruction devices are moved, a receptacle below said transverse compartment and means for raising said vertically movable door when said trap door is depressed.

2. In a trap, a trap housing having a lower compartment, provided with an opening, a vertically movable door arranged to close said opening, an upright passageway, a transverse passageway at the upper end of said upright passageway, a pronged member in said transverse passageway, trip means arranged to be released by the passage of an animal for supporting said pronged member in a raised position, a pivotally mounted trap door forming the bottom of said transverse passageway, movable obstruction devices in said upright passageway arranged to be lifted by the passage of an animal thereby and to drop down to prevent the return of said animal, means connected with said obstruction devices for raising and setting said pronged member when said obstruction devices are moved, a receptacle below said transverse compartment and means for raising said vertically movable door when said trap door is depressed.

3. In a trap of the class described, a housing having an upright passageway through which animals may ascend, obstruction means in said passageway arranged to be moved by the passage of an animal thereby, and to prevent the return of the animal, means having a transverse passageway communicating with the upper end of said upright passageway, a pronged member pivotally mounted in said transverse passageway releasable trip means for supporting said pronged member, and devices connected with said obstruction means for raising and setting said pronged member when said obstruction means is moved.

4. In a trap, a housing having an upright passageway through which animals may ascend, a pronged member pivotally mounted at the upper end of said passageway, releasable trip means for supporting said pronged member and obstruction means in said passageway connected with said pronged member and arranged to be moved by an ascending animal to raise and set said pronged member.

JULIUS NASS.
GEORGE MOHR.